(12) United States Patent
Karkkainen et al.

(10) Patent No.: US 10,586,291 B2
(45) Date of Patent: Mar. 10, 2020

(54) USABILITY OF STANDS MARKED FOR CUTTING IN TIMBER SUPPLY TO FACTORIES

(75) Inventors: Kauko Karkkainen, Joensuu (FI); Tero Anttila, Valkeakoski (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 388 days.

(21) Appl. No.: 13/699,135

(22) PCT Filed: May 19, 2011

(86) PCT No.: PCT/FI2011/050458
§ 371 (c)(1),
(2), (4) Date: Nov. 30, 2012

(87) PCT Pub. No.: WO2011/144817
PCT Pub. Date: Nov. 24, 2011

(65) Prior Publication Data
US 2013/0073205 A1    Mar. 21, 2013

(30) Foreign Application Priority Data
May 20, 2010 (FI) ..................... 20105552

(51) Int. Cl.
  *G06F 15/18* (2006.01)
  *G06Q 50/02* (2012.01)
  *G06Q 10/06* (2012.01)

(52) U.S. Cl.
CPC ............. *G06Q 50/02* (2013.01); *G06Q 10/06* (2013.01); *Y02A 40/232* (2018.01)

(58) Field of Classification Search
CPC .................................................. G06Q 50/02
See application file for complete search history.

(56) References Cited

U.S. PATENT DOCUMENTS 5,963,733 A     10/1999  Howard
6,937,939 B1 *   8/2005  Shibusawa ........... G01N 21/314
                                                250/255
(Continued)

FOREIGN PATENT DOCUMENTS

CA    2551300 A1   12/2007
CN    1317941 C     5/2007
(Continued)

OTHER PUBLICATIONS

Reisinger et. al, Evaluating Terrain for Harvesting Equipment Selection, Journal of Forest Engineering, vol. 1, No. 1, Jul. 1989, pp. 9-16.*

(Continued)

*Primary Examiner* — Mohamed Charioui
*Assistant Examiner* — Christine Y Liao
(74) *Attorney, Agent, or Firm* — Cantor Colburn LLP (57) ABSTRACT

A data system and a method for determining the harvestability and transportability of a stand marked for cutting, the method comprising: maintaining data on the properties of the soil of the stand; determining a value for the harvestability and transportability of the stand, which value is dependent on said properties; defining said value also on the basis of such conditions of said stand which affects said properties; maintaining data on the harvestability and transportability defined for the stand. Said property is one or more of the following: soil type, auxiliary attributes of the soil type, other permanent factors. Said conditions are one or more of the following: snow depth, frost depth, soil moisture content, temperature, amount of rainfall, quantity of growing stock, relations between tree species, other variable factors.

11 Claims, 2 Drawing Sheets

(56) References Cited

U.S. PATENT DOCUMENTS

| | | | |
|---|---|---|---|
| 7,610,311 B2* | 10/2009 | Park et al. | |
| 7,711,531 B2* | 5/2010 | Kapadi | G06Q 10/04 702/1 |
| 8,671,006 B2* | 3/2014 | Zyskowski | G06Q 10/06 435/252.2 |
| 2003/0139983 A1* | 7/2003 | Spencer et al. | 705/28 |
| 2006/0282467 A1* | 12/2006 | Peterson | G06Q 50/02 |
| 2007/0150332 A1* | 6/2007 | Grichnik et al. | 705/10 |
| 2008/0015711 A1 | 1/2008 | Charland et al. | |
| 2009/0099776 A1* | 4/2009 | Kapadi | G06Q 50/02 702/3 |

FOREIGN PATENT DOCUMENTS

| | | | |
|---|---|---|---|
| WO | 98/17099 A1 | 4/1998 | |
| WO | WO 2009048341 A1 * | 4/2009 | G06Q 10/06 |

OTHER PUBLICATIONS

Suvinen, Antti, "A GIS-Based Simulation Model for Terrain Tractability," *Journal of Terramechanics* pp. 427-449, vol. 43, 2006.

Oct. 10, 2013 European Search Report issued in European Patent Application No. EP 13 182 897.2.

Jun. 11, 2015 Office Action issued in Russian Patent Application No. 2012155343.

May 6, 2015 Office Action issued in Chinese Patent Application No. 201180024989.4.

Apr. 14, 2015 African Regional Intellectual Property Organization Office Action issued in Patent Application No. AP/P/2012/006618.

Frombo, F. et al. "Planning woody biomass logistics for energy production: A strategic decision model". Biomass and Bioenergy, vol. 33, pp. 372-383, 2009.

Translation of Jan. 25, 2016 Office Action issued in Chinese Patent Application No. 201180024989.4.

Dec. 11, 2015 Office Action issued in African Regional Intellectual Property Organization Application No. AP/P/2012/006618.

Juha-Matti et al. "[Mat-2.4177] Project Work Seminar on Operation Research" Analysis on Harvestability and Accessability of Standing Timber Pattern; University of Technology, Department of Information and Natural Sciences; Project Work; Apr. 20, 2009 (Partial Translation).

Harstela, P Timber Procurement. Teoksessa: Kellomaki S. (toim.): Forest resources and sustainable management, Papermaking Science and Technology, Book 2. 1989 pp. 334-340.

Harstela, P. Forest Work Science and Technology, Part 1, Silva Carelica 25. Joensuunyliopisto 1993, 14 pages.

Kokkila, M.: "Geospatial data based trafficability evaluation as an aid in planning and implementing wood harvesting", in publication Metsätieteen aikakauskirja (Forestry Review) 4, 2001, pp. 640-643.

Malinen, J. Locally Adaptable Non-parametric Methods for Estimating Stand Characteristics for Wood Procurement Planning, Silva Fennica 37(1): 109-120 (2002).

Skjal, A. et al. An Optimization Model for Tactical Planning of Wood Procurement. 42nd Hawaii International Conferecne on System Sciences, Waikoloa, Big Island, Hawaii, 2009 pp. 1-9.

* cited by examiner

USABILITY OF STANDS MARKED FOR CUTTING IN TIMBER SUPPLY TO FACTORIES

FIELD OF THE INVENTION

The invention relates to a method and a data system for determining the harvestability and transportability of a stand marked for cutting.

BACKGROUND OF THE INVENTION

Harvesting is an important step in the wood processing chain, creating a basis for the profitable wood processing chain from the forest to the client. A wood procurement organization is responsible for deliveries of raw material to factories, that is, production plants, and of fuel to combustion plants. A raw material purchase order is based on the demand of end products. Wood raw material is delivered according to purchase orders, with respect to the date of delivery, quantity and quality. An object in the planning of harvesting is that a correct quantity of the wood raw material needed can be delivered at the right time. The operation is determined by a procurement plan according to the raw material purchase orders of the production plants. The annual procurement plan is expanded in a plan for a few months, for example.

Roadside storages must contain a quantity of timber assortments complying with transportation plans at agreed time. By controlling the harvesting, the storages are kept in desired size and the ratio of timber assortments in them is kept to best correspond the situation at each time. A smooth flow of information is a requirement for successful operation. For the control, data systems are applied in such a way that a flexible supply of raw material becomes possible.

From the available resources or reserves of stands marked for cutting, suitable stands and ranges are selected for harvesting. Seasonal variation has a strong effect on the harvesting, which is particularly difficult in seasons of impassable road conditions.

Sources of raw material include forests owned by e.g. forest companies, corporations, and private persons. In a timber sale contract, an agreement is made on the timber assortments to be harvested and their quantities, and also on the harvesting of fuel wood, if necessary. In sale at delivered price, the seller commits himself to deliver the agreed quantity and assortment of timber to the delivery point at the agreed time. In sale of standing timber, the buyer takes care of the felling of the quantity and assortment of timber as the object of purchase, and its transportation from the forest. Timber assortments include, among other things, pine log, pine pulpwood, spruce log, spruce veneer log, spruce pulpwood, birch log, birch pulpwood, other logs, other pulpwood, and wood fuel, such as stumps and logging residue.

Timber is supplied to a production plant or a combustion plant from several different sources, wherein purchases for delivery to a mill yard, purchases for delivery to a roadside storage, as well as harvesting by the plant's own organization, and other procurement of wood are feasible. The wood raw material is typically delivered to the buyer from several different sources based on a transportation plan, and timber is delivered to the buyer from stands marked for cutting and harvesting, from roadside storages used as delivery points, and from timber terminals.

By utilizing data systems, the data of a stand ready for harvesting are trans-ferred from the party responsible for logistics to the forest machine company, even directly to a harvesting machine, and the logging contractor is responsible for the harvesting. The data of ready timber are transferred to the data system of the wood procurement organization, and the transportation plan is drawn up on the basis of the data received.

In the planning of the stand marked for cutting, data is produced for planning the harvesting. It determines, for example, the accumulated quantity of timber from the stand marked for cutting, and if necessary, the stand is divided into ranges to be harvested. In the planning of harvesting, the locations of roads and storage points are also determined. Factors affecting the scheduling of the harvesting of the marked stand and the range to be harvested include the wood demand of the processing plants and the reserve of stands marked for cutting, as well as the bearing capacity of the stands marked for cutting and of the roads to be used. The equipment will be selected on the basis of the felling method, the heaviness of the standing timber to be felled, the time of harvesting, and other site condition factors. The harvesting method applied is typically cut-to-length (CTL) logging with a chain of machines consisting of a harvester and a forwarder.

For the marked stand and the range to be harvested, harvestability and transportability as well as possible time of harvesting are also defined. For example on peaty soils, poor bearing capacity of the soil must be taken into account for the harvesters and forwarders. Harvesting of peaty soils predominated by spruce is performed when the soil is frozen, to avoid damage to the roots. In a forest stand predominated by pine, harvesting is also possible when the soil is unfrozen. For peaty soils with good drying conditions, the harvesting and transportation conditions in the summer may be almost the same as for mineral soil.

According to the prior art, the stand marked for cutting can also be planned automatically in advance. For stocktaking of forest resources, remote sensing methods are also used, in which, for example, airborne laser scanning (ALS) and aerial photographs are applied. By means of the methods, the data obtained can be used for automatic determining of standing timber patterns, that is, homogeneous areas with similar dominant tree species and growing stock density. An analysis based on laser scanning will also produce data on the standing timber with respect to the tree species and length, and by means of modelling, data can even be obtained on the diameter and volume of trees. Laser scanning will also produce a topographical model of the terrain, which information can be utilized for planning the harvesting, particularly for determining the transportability. The stands marked for cutting are formed automatically, and, for example, thinning or final cutting is selected. On the basis of the data, it is also possible to conclude the quantity and assortment of timber to be obtained from the stand. The data can be updated or checked by means of a field inspection when needed.

In planning the harvesting, not only automatic allocation of stands to be marked for cutting is used, but also data on the road network in the form of geographic information and typically also the road classification. In harvesting, the road network also forms passage obstacles, but the data on the road network can also be utilized for selecting a location for a roadside storage. Passage obstacles are also formed by water systems, on which data is obtained in the form of geographic information for planning the harvesting. Terrain contour lines are also available in the form of geographic information. Briefly defined, geographic information (GI) is information with a position. The data to be described is so-called property information. Geographic information is produced, for example, by soil investigating organizations.

In a data system, it is thus possible, on the basis of remote sensing and geographic information according to prior art, to plan both the stands to be marked for cutting and the location of roadside storage points, and also to lay out the transportation routes from the stand to the storage point, taking into account the limitations set by the terrain and the environment. In practice, the transportation is implemented by means of forwarders, so that on the basis of a topographical model it is possible to lay out the transportation routes to locations passable for a forwarder, taking into account, for example, the tilt angles.

Data on the soil type is also available in the form of geographic information, on the basis of which it is possible to define the primary soil type of the stand to be marked and the range for harvesting. The soil types include, for example, mineral soil types and organic soil types. The soil type is further specified with additional attributes which indicate how the soil types deviate from their basic type. The mineral soil types include, for example, boulder soil and cobbly soil, gravel soil, morainic soil, sandy soil, fine-sand soil, silty soil, and clay soil. The organic soil types include, for example, slimy and muddy soil, as well as humus soil, consisting of top soil or peaty soil type.

In harvesting, a temporal description which is partly based on the seasons is used for determining harvestability and transportability. For the mineral soil types, the bearing capacity of the terrain varies to a great extent, so that the bearing capacity plays an important role in determining the harvestability. Forests on peaty soils are almost always classified to be harvested in the winter, although there is great variation. Furthermore, it should be noted that the amount of growing stock also affects the bearing capacity of the terrain, particularly because of the amount of rootage. When the bearing capacity of the soil is sufficient, the soil can bear the weight of the harvester and particularly the forwarder carrying a load of timber.

Conventionally, stands marked for cutting are divided into three different classes according to harvestability. In stands marked for cutting during the season of frost damaged roads, timber can be harvested and transported at any time, even during the seasons of poor road conditions in the spring and in the autumn. In stands marked for cutting in the summer, timber can be harvested and transported at other times than in the spring and in the autumn when the roads are impassable. In stands marked for cutting in the winter, harvesting and transportation is only possible when the soil is frozen. The classification can also be selected in another way; for example, stands which can be harvested when the soil is unfrozen are divided into subclasses, and, for example, harvesting and transportation are possible provided that there is low autumn rainfall even if the summer was rainy, or during a dry summer only.

The primary soil type of the stand marked for cutting and the range to be harvested, as well as the soil type of the transportation routes, can be obtained by utilizing e.g. geographic information. The harvestability and the transportability can be concluded, for example, on the basis of certain rules or experience. In the prior art, the primary soil type has determined the times when harvesting is not possible or is possible but at varying costs. Information on the costs of harvesting at different times of harvesting, the possible transportation routes at different times of harvesting, the costs of transportation caused by different transportation routes, the numbers of visits to the stand or the range to be harvested, and the quantities and assortment of timber to be obtained from the stand is used in the prior art for calculating the harvesting costs at different times of harvesting. On the basis of this data, it is possible to make the desired optimization, to find out, for example, the optimal harvesting time in view of the costs.

The selection and optimization of transportation routes according to the prior art, based on the planning of the stand, is discussed in the document Koljonen, Juha-Matti et al: Mat-2.4177 Operaatiotutkimuksen projektityöseminaari: 4. Puustokuvion korjuukelpoisuus ja saavutettavuusanalyysi [Project work seminar on operation research: 4. Analysis on Harvestability and Accessibility of Standing Timber Pattern] (University of Technology, Department of Information and Natural Sciences; Project work; Espoo, 20 Apr. 2009).

However, in view of harvestability and transportability, said classification based on geographical information and derived from it is insufficient or is not sufficiently accurate for planning the harvesting. Significant annual variations may occur in the environmental conditions, for example in view of the onset and depth of soil frost, the quantity of snow, and also the amount of rainfall. The classification according to the prior art may lead to the harvesting of a marked stand for example only when the soil is frozen, although a more accurate inspection would show that it would also be possible in the summer. Similarly, the definition of harvestability and transportability is usually made in connection with the timber sale contract and the field inspection, wherein the assessment may be incorrect or insufficient so that harvesting is no longer possible because the bearing capacity of the soil has changed as a result of raining. The classification can be specified by adding further classes, but the planning of harvesting still lacks information on whether the real harvestability and transportability of, for example, a stand marked for cutting, for example its bearing capacity or an index describing it, corresponds to the value defined on the basis of, for example, geographic information on the soil type of the ground.

It is true that the classification can be improved by means of geographic information, but the definition of the harvestability and transportability is still not on a sufficiently accurate level so that the whole wood processing chain would operate optimally and could provide the deliveries of wood raw material in a reliable way and on the basis of exact data. Inaccurate and incorrect data constitute an unnecessary burden on the whole wood processing chain.

BRIEF SUMMARY OF THE INVENTION

It is an aim of the invention to eliminate problems presented above.

The method according to the invention for determining the harvestability and transportability of a stand marked for cutting is presented in claim 1. The data system according to the invention for determining the harvestability and transportability of a stand marked for cutting is presented.

By means of laser scanning and by utilizing data systems, it is possible to create the stands automatically according to criteria selected by the user. Of the stands formed, it is possible to create a reserve of stands marked for cutting, wherein the stand is also allocated a probable measure, such as rest, final cutting or thinning. For each stand, the quantity and assortments of timber are known. On the basis of the reserve of stands, it is also possible to form, by calculation, a reserve for each assortment of timber, for example for one or more limited geographical areas, for example according to provinces or on the basis of the wood procurement organization. Said reserve is available for deliveries of wood raw material with a delay relating to the harvesting.

Geographical information on the soil is used to determine the soil type, since the harvestability and transportability of the stand are dependent on the negotiability of the terrain and its capacity to bear the load of heavy forest machinery. However, the properties of even the same soil type vary according to the moisture content and the temperature of the soil. In determining the harvestability and transportability, models should be applied, which define the behaviour of each soil type particularly on the basis of the moisture content of the soil type but also according to snow depth and/or frost depth. In the determination, it is also possible to utilize other geographical information, such as terrain contour lines or a topographical model. According to one example, a so-called bearing capacity index is determined for harvestability and transportability, which index is dependent on, among other things, the bearing capacity of the soil. The bearing capacity index relates particularly to the harvesting and the transportation of wood raw material to a roadside storage.

The harvestability and transportability as well as the bearing capacity index determine the properties required of the forest machines used for harvesting, particularly the surface pressure relating to the bearing capacity. Factors affecting the surface pressure include the unloaded weight of the harvester, the weight of the load and the equipment combined, that is, the total weight of the harvester, the distribution of weight between the front and rear ends of the harvester, the surface area of the wheels or crawler tracks, and the assumed sinking of the harvester into the soil. The travelling properties of the harvester can be influenced by various methods or equipment, including e.g. wider crawler tracks and wheels, increasing the size and number of tyres, increasing the bearing surface of the track rollers with auxiliary wheels, and using dual wheels.

Said factors can be used to determine a bearing capacity classification for harvesters, which is dependent e.g. on the surface pressure caused by the harvester, which, in turn, is dependent on the equipment of the harvester. Preferably, there is a relation between the bearing capacity index and the bearing capacity classification, by means of which the person performing the harvesting, or a logging contractor, can select a harvester and a forwarder suitable for the work. Preferably, the bearing capacity index is also transferred with other data on the stand to e.g. the logging contracting company.

The soil moisture content, the snow depth, and the frost depth are preferably obtained in the form of geographical information from operators maintaining and/or forecasting condition data. The condition data are based on, for example, remote sensing. The effect of condition data on the bearing capacity of the soil can be obtained on the basis of models on the behaviour of the ground. The temperature of the environment, thermal accumulation, amount of rainfall, or rainfall accumulation can also be taken into account in the models.

The developed system and method can be used for continuous updating of the harvestability and transportability on the basis of the behaviour of the soil type according to the real-time conditions of the soil type or according to those real-time conditions of the environment which affect the behaviour of the soil type. In an example, said bearing capacity index is updated according to the prevailing conditions.

By main log haul, the timber is transported from a storage location to a production plant or a combustion plant, or to a terminal storage. Road classes include, for example, trunk roads, main haul roads, and temporary forest roads. The trunk roads collect transportation from the main haul roads and temporary forest roads, and they should bear transportation even during spring breakup. A main haul road collects transportation from temporary forest roads and often intersects with a public road and a trunk road. A main haul road is built to bear transportation during the poor road conditions in the autumn and often also in the spring. Temporary forest roads are used for transportation in seasons other than frost damage periods. Furthermore, it is also possible to use winter roads, which are temporary forest roads used only when the soil is frozen. Thus, the harvestability and the transportability of the roads are also influenced by the road class and particularly the limitations during periods of poor or impassable road conditions. In an example, the road network or said road classes are also allocated a so-called bearing capacity index dependent on the bearing capacity of the road.

The amount of rainfall will affect the condition of forest roads and gravel roads and thereby also main log haul. The harvestability and transportability of the road network can be updated according to the conditions of the environment. In an example, said bearing capacity index is updated according to the prevailing conditions.

Timber cannot be transported from a stand or a storage point, particularly from a roadside storage, if the road is not usable because of poor road conditions or limitations during a frost damage period, or when the bearing capacity is not sufficient. In such a case, the stand is not usable for wood supply.

When the data on the harvestability and transportability of the stand are combined to the harvestability and transportability of the road network, the data on timber quantities and assortments in roadside storages, as well as the data on timber quantities and assortments in terminals and other storages, it is possible to make various updated real-time usability analyses, which also take into account the conditions of the environment and in which the data are significantly more accurate than before. Thus, the planning of harvesting is also more accurate, and the periods of planning can be made significantly shorter than by techniques of prior art. This allows more flexibility in changing situations, for example when the demand for raw material increases fast or the conditions of the environment change more than is usual.

More accurate planning information for planning the harvesting also makes it possible to utilize stands which are problematic in view of harvestability and transportability, for example at a time when the harvesting of also these stands is allowed by favourable conditions of the environment. Thus, stands which are easier to harvest can be saved for a time when the conditions of the environment are poor.

The planning of harvesting takes place at a given moment of time, and it is normally followed by a delay to the time when the harvesting is started and the timber is available at an agreed delivery point. Environmental conditions may change, for example in view of the onset and thickness of soil frost, the quantity of snow, and also the amount of rainfall. Thus, the real harvestability and transportability no longer correspond to the updated data on the prevailing harvestability and transportability, or the bearing capacity index, used for the planning. The changed conditions may have even a great effect on the costs of harvesting and transportation, for example in view of the costs for the transportation route and the harvesting.

Thus, the model utilized in the system and the method developed, determining the harvestability and transportability, is supplemented with a prediction of the future conditions, wherein analyses on usability and planning of harvesting can be carried out even more accurately than before and not merely on the basis of the conditions prevailing at the time of planning. Thus, the reserve of timber assortments and quantities will vary at each time, but the variation can now be predicted. The prediction can be compared with the demand for wood raw material in the production plants, and the operation of the wood processing chain can be adapted to meet the demand. By means of the harvestability and transportability changing in a predictable way, it is possible to select exactly those stands to be harvested which are usable at a desired time. Said desired time may thus also be in the future. The longer the range of prediction of the conditions, and the more reliable the prediction is, the longer the period of time for which the wood supply can be planned very accurately. The prediction may also be based on average condition values, history data, or trend data, and the accuracy may vary.

The predictions relate to changes particularly in the temperature and the amount of rainfall, which affect, among other things, the soil moisture content and the depth of snow and frost. An accurate prediction may cover, for example, the next 1 to 2 weeks, preferably 10 days, and a less accurate prediction may cover periods longer than this.

Preferably, the planning is implemented in a data system that utilizes various databases or other data storages, including, for example, geographical information. The data system utilizes, for example, telecommunication networks for data transmission, or it provides a database to which the users of the planning data have access via telecommunication networks. The data system produces various reports and analyses for various needs for different users and for control of operation. In the planning, various algorithms, models and rules are utilized, which, on the basis of initial data, produce desired results to be utilized by the data system or users.

DESCRIPTION OF THE DRAWINGS

In the following, the invention will be described by means of examples and with reference to the appended drawings, in which.

DETAILED DESCRIPTION OF THE INVENTION

Figure 1:
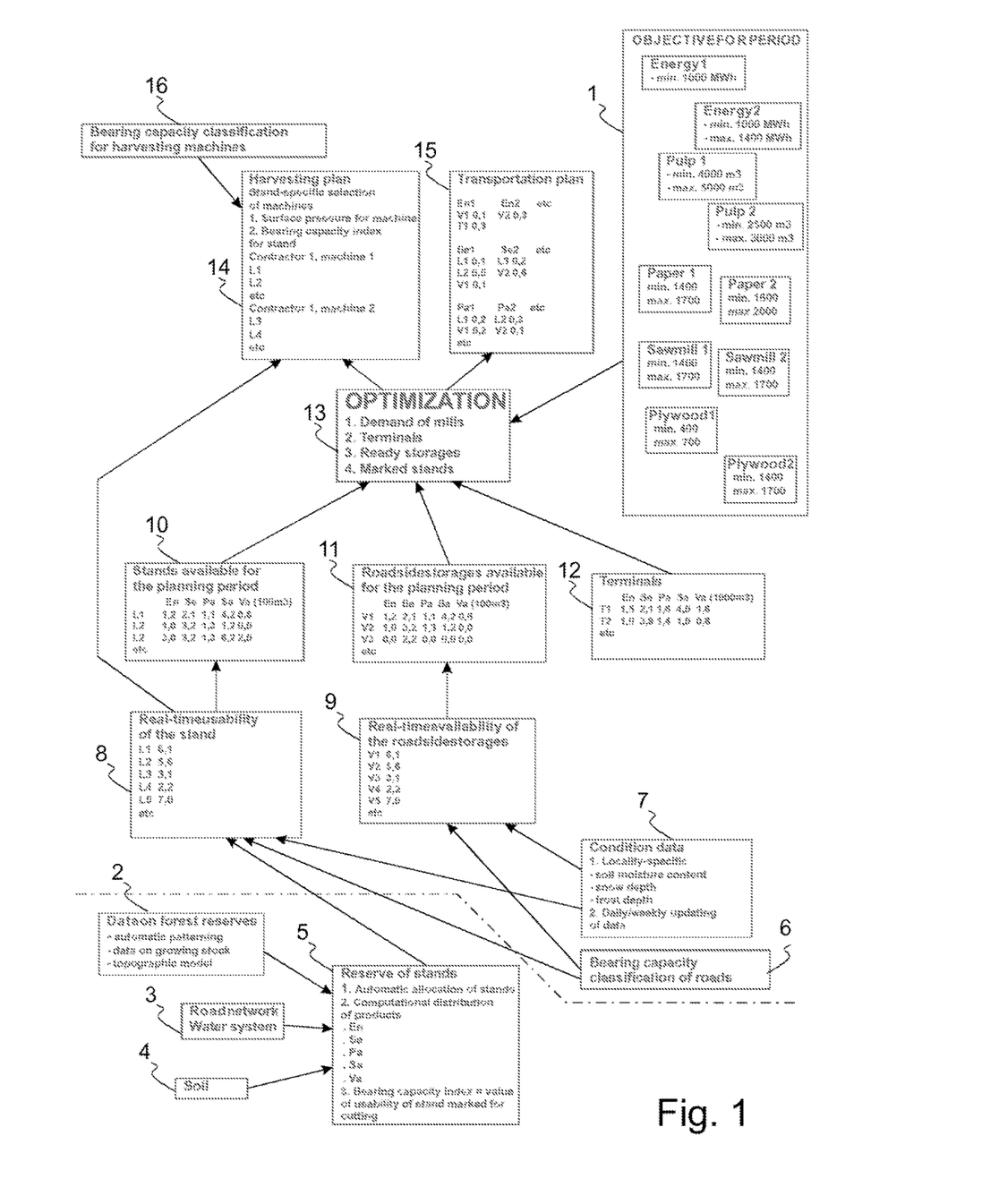
FIG. 1 is a block chart showing the total optimization of wood supply and its various sectors in view of planning.

FIG. 1 shows different sectors of wood supply in the form of a chart, where the blocks of the chart illustrate data to be used in planning or to be produced by means of planning. The connections between the blocks illustrate the data used as a basis for generating other data, and the factors affecting them. The data used include, for example, geographical information or other information from a database, or information to be obtained elsewhere, for example forecast information. The data to be used are obtained, for example, from operators maintaining and/or predicting condition data. The processed data formed in the blocks may also be used as data material for other blocks. The data to be formed and the optimization are based on, for example, decisions, algorithms, models, or rules, which utilize various data material available. The system and the method according to the chart are implemented preferably in a data system utilizing various databases or other data storages located in a telecommunications network and its data systems based on computers, servers and networks, which the users of the system utilize and which are used for storing data collected either automatically or manually.

Block 1 illustrates the demand and need of various production plants (En1 (energy), EN2, Se1 (pulp), Se2, Pa1 (paper), Pa2, Sa1 (sawmill), Sa2, Va1 (plywood), Va2, etc.) for a given planning period, and forms a basis for optimization 13, which, on the basis of available data (e.g. demand of production plants, situation at terminals, situation in storages, stands in reserve), draws up a transportation plan 14 and a harvesting plan 14 for the reserve of stands marked for cutting. The transportation plan 15 defines the transportation from the different stands (L1, L2, etc.) and storage points, such as roadside storages (V1, V2, etc.) and terminals (T1, T2, etc.) to the different production plants.

Figure 2:
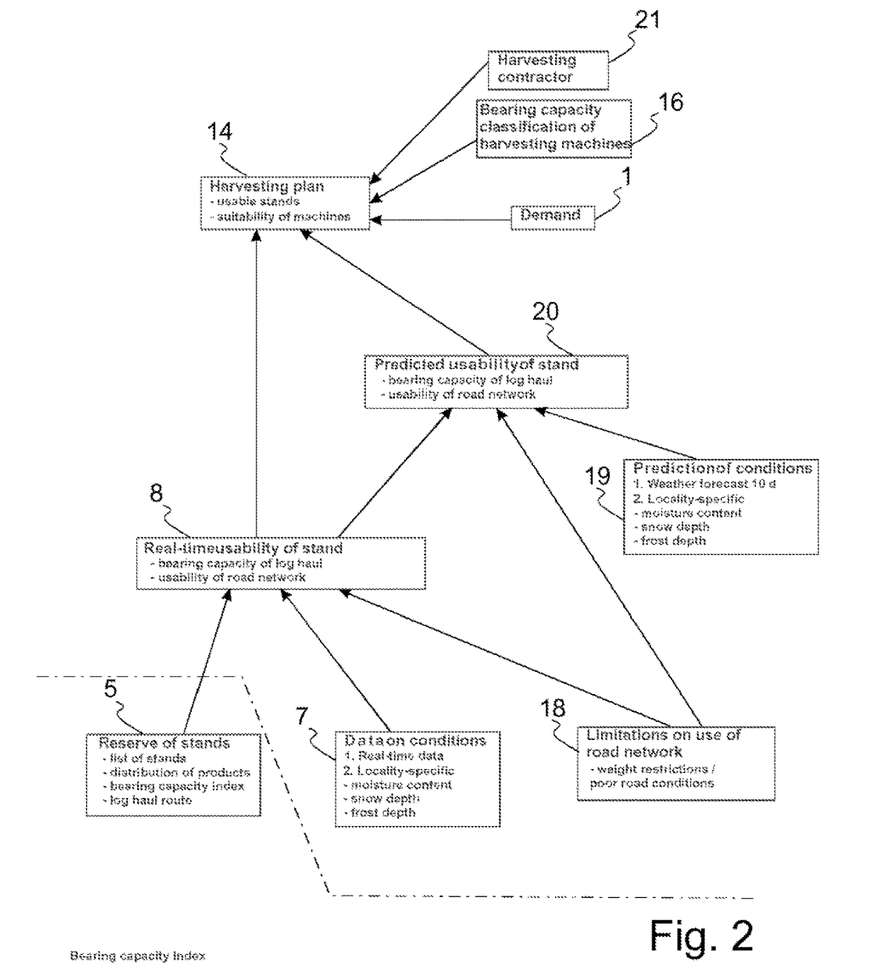
FIG. 2 is a chart illustrating the operation of one sector, for systematic utilization of the stands marked for cutting.

In the harvesting plan 14, it is also possible, according to one example, to select the forest machine according to the stand, or, if necessary, even according to the logging contractor, on the basis of the harvestability and transportability, particularly the bearing capacity index. In one example, the forest machines are allocated a bearing capacity classification 16, on the basis of which the selection is made. In an alternative example, the harvesting plan merely contains data on the bearing capacity index, on the basis of which the person performing the harvesting makes the choice on the machine himself; for example, harvesting contractor 21 is feasible, as shown in FIG. 2.

A reserve 5 of stands has been provided according to the prior art by utilizing data on forest resources. The data can also be obtained automatically, for example by laser scanning, and the stands can also be formed automatically. Stands can also be included in the reserve 5 of stands in other ways. Road network data 3 and soil data 4 are available, for example, in the form of geographic information, and they are used to form e.g. a bearing capacity index. The assortment of wood products (En, Se, Pa, Sa, Va, etc.) and the quantities of the different wood products to be obtained from the reserve of stands and from single stands is given, for example, in the form of a list or a table. At this stage, each wood product is allocated to a given purpose, such as energy, pulp, paper, sawmill, plywood. The use will be determined, for example, by the detected diameter of the trunk, so that wood raw material from the same stand will be transported to even several different production plants. The allocation will be guided by the demand.

Information on the harvestability and transportability of the road network is available in the bearing capacity classification 6 of the road network. The bearing capacity classification 6 and the condition data 7, which describe primarily the present situation, such as the soil moisture content and the snow depth, are combined with the data on the reserve 5 of stands. Each stand is located in a given locality, so the condition data are preferably specific to the locality. For example, county or province specific data on the conditions can also be used as condition data for the stands. Limitations 18 on the use of the road network may also be applied, as shown in FIG. 2. The limitations relate particularly to limitations or prohibitions of use because of poor or impassable road conditions. Algorithms, models or computations are used to determine the updated, real-time usability 8 of the stand, which in this example is indicated by a bearing capacity index. The updating can be performed sufficiently often, even several times a week. The usability is determined for the whole reserve or a subset of stands on the basis of e.g. a limited geographical area.

The bearing capacity classification 6 and the condition data 7 are also combined with the data on the roadside storages, wherein the updated, real-time usability 9 of the roadside storages is obtained, which in this example is indicated by a bearing capacity index.

The harvestability and transportability must be at a sufficient level so that the stand or roadside storage would be usable during the planning period. If the level is not sufficient, then suitable or sufficient harvesting and transport equipment is not available to perform the harvesting and transportation to achieve a supply that meets the demand. Harvesting under difficult conditions may also require special equipment, or it is more difficult, which may unnecessarily increase the costs. In the case of a large reserve of stands, stands marked for cutting are always found for harvesting, but the data system will now indicate the stands to be harvested or the storages available. From the list of stands, it is possible to select, for example, stands with a given bearing capacity index to be harvested, and these are used to satisfy the demand at each time. If more stands are needed, it is also possible to include stands with a higher bearing capacity index, according to the need.

In an example, the presented system is also used for optimizing the costs. Preferably, harvesting should also be carried out in such stands whose bearing capacity index is only rarely at a sufficient level. Those stands whose bearing capacity index is almost always at a sufficient level can be utilized particularly at times when the bearing capacity indices are reduced in general, because of difficult conditions. The impact of different factors can be weighted by optimization, and the final outcome will comprise the stands 10 available for the planning period and the data on the quantity and assortment of timber in them. The optimization result can also be influenced by taking various cost factors into account. The situation varies according to the updates, but an accurate list of stands and data on the quantities and assortments of timber can be continuously maintained for all stands, and storages as well.

The harvestability and transportability of roadside storages must also be at a sufficient level. The result of the optimization will be roadside storages 11 and data on the quantities and assortments of timber in them, usable for the planning period.

Data on the quantities and assortments of timber in the terminals 12 are available. The timber is available at almost any time.

By combining the data from the blocks 10, 11 and 12 in the data system, the necessary optimization 13 is performed, producing the harvesting plan 14 and the transportation plan 15. The object is to provide a supply that meets the demand in different production plants within the planning period.

The data of the blocks 10, 11 and 12 are available for the present and in many cases also for a given period in the future, and even for the whole planning period, if the conditions are not drastically changed. Changes in the harvestability and transportability, that is, the bearing capacity index, affect particularly the block 10. Provisions for changes in the conditions can be made e.g. by means of storages. The timber can be obtained from a storage, if it is not available from the selected stands, as planned.

For producing the harvesting plan 14, data of the block 8 on the harvestability and transportability of the stand are utilized.

As shown in FIG. 2, for the formation of the harvesting plan, it is also possible to make a prediction which is primarily based on a forecast on the changes of conditions in the locality of the stand. The data available is, for example, a weather forecast, particularly relating to the temperature and the amount of rainfall. The data are obtained, as already mentioned above, from operators maintaining and/or predicting condition data. The condition prediction 19 is combined with the data of the block 8, wherein the predicted availability 20 of the stand is obtained, relating to all the stands or only some specific stands.

For producing the harvesting plan 14, data of the block 20 on the harvestability and transportability of the stand are utilized, based on the prediction. The prediction can be used to schedule the measures of the harvesting plan more accurately or to secure the realization of the harvesting plan.

The systems according to FIGS. 1 and 2 are implemented by means of a suitable data system, on the basis of e.g. computers. Blocks 8 to 15 and block 20 can be implemented in the same data system which utilizes e.g. geographical information or other material, for example for the blocks 5, 6, 7, and 16, as well as for block 19.

In an example, the bearing capacity index is primarily determined according to the soil type. For determining the bearing capacity index, it is possible to use various models which may be even complex, but in some examples, e.g. tabulation and computation can be utilized. The basis may be, for example, a basic bearing capacity index given for the soil type, to be increased or decreased by the conditions according to certain terms. The bearing capacity index of the soil type may also be affected by said additional attributes of the soil type and also by other constant factors which may be used, if desired, for example stone content. A criterion for meeting the terms is, for example, various condition data. Different soil types may differ in meeting the terms. When a desired number of conditions and other factors are taken into account, if they should be sufficiently taken into account according to the terms, the bearing capacity index is finally obtained. In addition to climatic conditions, the conditions may also include other variable factors, such as properties of the growing stock, for example the quantity of growing stock or the relations between tree species. In an example, the bearing capacity index may receive a value between 0 and 12, and the value 6 gives a bearing capacity for soil on which most typical forest machines can be driven. For the soil types, the soil type with the best bearing capacity receives the value 6, and the soil type with the poorest bearing capacity receives the value 0. Said value is a kind of a basic bearing capacity index. Various factors, particularly conditions, affect the bearing capacity index either negatively or positively. For example, an increasing frost depth will have an adding effect by a value from +0 to +6, an increasing snow depth will have an adding effect by a value from +0 to +4, and an increasing rainfall amount for a given period will have a subtracting effect by a value from −0 to −2. The felling method will have an effect on the bearing capacity index; for example, thinning will have an effect by the value of −1. In thinning, the dominant tree species will have an effect on the bearing capacity index; for example, spruce as the dominant species will have an effect by the value of −1. On peaty soils, the increasing quantity of growing stock will affect the bearing capacity value by a value from −1 to +3. Various terms and rules for the interactions of different factors can also be created on how they affect the computation of the bearing capacity index. If necessary, it is also possible to take other factors into account, increasing or reducing the bearing capacity index. The aim is to automate the computation of the bearing capacity index as far as possible in the data system, on the basis of the data collected and stored by the data system.

When the behaviour of a soil type is examined for a given moment of time in the future, the basic bearing capacity is changed, depending on the conditions prevailing at said moment of time. Thus, for example, the forecast rainfall for said moment of time, or forecast changes in amounts of rainfall in the time window between said moment of time and the present moment of time, will be utilized. Instead of the present time, it is also possible to use another moment of time, at which the state of the stand is known sufficiently accurately, particularly with respect to the bearing capacity index. In an example, real time data are used as the data for the present moment of time, for example the real-time bearing capacity index, whose change is evaluated by means of said forecasts. By means of updating the condition data and the forecast data, also the predicted bearing capacity index is constantly changed.

The bearing capacity classification of the forest machine can be determined to correspond to the above-presented bearing capacity index, or there is a clear interdependence between them. Different machine types, such as harvesters and forwarders, are classified, for example, on the basis of the bearing capacity index needed by said forest machine to perform harvesting or transportation successfully. For example, a typical loaded forwarder receives the value of 6, and a forwarder with special equipment and causing a low surface pressure will receive the value of 4. A harvester will receive a value that is even lower than this. The bearing capacity classification is based on the more specific properties of the forest machine, which are also affected by the equipment. The bearing capacity classification can be determined primarily on the basis of the surface pressure caused by the forest machine on the soil. By means of the bearing capacity classification and the bearing capacity index, a clear picture is formed on which stands can be harvested and how the forest machinery meets the local conditions.

Figure 3:
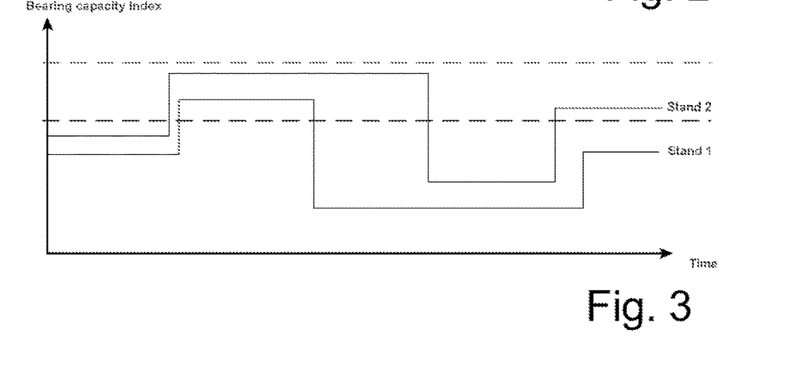
FIG. 3 illustrates temporal variation in the harvestability and transportability of a single stand marked for cutting.

FIG. 3 illustrates the variation of the bearing capacity index of two different example stands in time, for example during the period between the signing of the timber sale contract and the harvesting of the stand. In the figure, the area between the broken lines also illustrates the bearing capacity class or classes, on which the harvesting is typically focused. The bearing capacity index for a given moment indicates either the real-time bearing capacity index or a predicted bearing capacity index. Both bearing capacity indices can also be included in the same figure, wherein it is possible e.g. to follow up the outcome of the prediction of the bearing capacity index. By means of the follow up, it is possible to develop and adjust the computation, models or algorithms. The data on the change of the bearing capacity index can also be stored in a database, wherein the history data on the stand or range can also be utilized later on, if necessary, for example for compilation of statistics or planning of harvesting.

The invention is not limited solely to the above-presented examples, but it can be applied within the scope of the appended claims.

The invention claimed is:

1. A method of harvesting forest stands comprising:
    maintaining data in a computer-implemented database on properties of soils of forest stands marked for cutting;
    determining on a basis of weather forecast data for a given future moment of time, future weather conditions prevailing in the forest stands at said given future moment of time, said future weather conditions, when changing affecting said properties of the soils of the forest stands;
    receiving said weather forecast data for said given future moment of time in a form of geographic information from an operator maintaining or forecasting data related to said future weather conditions;
    computing, using a computer processor, on a basis of a model, a predicted value for a bearing capacity index for each forest stand, wherein said bearing capacity index is dependent on said properties of the soil of the forest stand, bearing capacity of the soil of the forest stand and said future weather conditions, wherein said values of said bearing capacity indexes change at different moments of time and depending on said future weather conditions; and
    maintaining data in a computer-implemented database on said values of said bearing capacity indexes determined for the forest stands;
    updating continuously said values of said bearing capacity indexes on a basis of said future weather conditions which are updated continuously;
    selecting, from said forest stands with said values of said bearing capacity indexes, forest stands that have said values corresponding a predetermined value of said bearing capacity index for a given moment of time or for a given planning period;
    selecting, from the forest stands that have the predetermined value of said bearing capacity index, forest stands that satisfy a predetermined demand of timber quantities and assortments for said given moment of time or for said given planning period;
    determining a harvesting plan for the predetermined demand satisfying forest stands utilizing said values of said bearing capacity indexes; and
    harvesting the predetermined demand satisfying forest stands using a selected forest machine.

2. The method according to claim 1, wherein said properties of the soil include soil type; and wherein said future weather conditions include one or more of the following: snow depth, frost depth, soil moisture content, temperature, amount of rainfall, quantity of growing stock, or relations between tree species.

3. The method according to claim 1, further comprising:
    maintaining data on values of usability of roadside storages and/or storages of timber; and
    maintaining data on timber quantities and assortments contained in roadside storages and/or storages of timber.

4. The method according to claim 1, further comprising:
    maintaining data in a computer-implemented database on bearing capacity classes of forest machines, the bearing capacity classes arranged in a predetermined way to correspond to said values of said bearing capacity indexes;
    determining, in said harvesting plan, the bearing capacity class required for said forest machine selected to be used for timber harvesting the predetermined demand satisfying forest stands.

5. The method according to claim 1, wherein the weather forecast data includes at least temperature and the amount of rainfall.

6. The method according to claim 1, further comprising:
    maintaining data in a computer-implemented database on bearing capacity classes of forest machines, the bearing capacity classes arranged in a predetermined way to correspond to said values of said bearing capacity indexes; and selecting the forest machine in such a way that the bearing capacity class of the the forest machine selected corresponds to said predetermined value of said bearing capacity index.

7. The method according to claim 1, further comprising:
selecting the forest machine in such a way that the forest machine has a bearing capacity classification corresponding to the bearing capacity index of the predetermined demand satisfying forest stands.

8. The method according to claim 7, wherein the harvesting plan includes said values of said bearing capacity indexes for the predetermined demand satisfying forest stands.

9. The method according to claim 1, further comprising:
selecting the forest machine in such a way that surface pressure caused by the forest machine on soil and related to bearing capacity of the soil is as required by the predetermined value of said bearing capacity index.

10. A method of harvesting forest stands comprising:
maintaining data in a computer-implemented database on properties of soils of forest stands marked for cutting;
determining on a basis of weather forecast data for a given future moment of time, future weather conditions prevailing in the forest stands at said given future moment of time, said future weather conditions, when changing affecting said properties of the soils of the forest stands;
receiving said weather forecast data for said given future moment of time in a form of geographic information from an operator maintaining or forecasting data related to said future weather conditions;
computing, using a computer processor, on a basis of a model, a predicted value for a bearing capacity index for each forest stand, wherein said bearing capacity index is dependent on said properties of the soil of the forest stand, bearing capacity of the soil of the forest stand and said future weather conditions, wherein said values of said bearing capacity indexes change at different moments of time and depending on said future weather conditions; and
maintaining data in a computer-implemented database on said values of said bearing capacity indexes determined for the forest stands;
updating continuously said values of said bearing capacity indexes on a basis of said future weather conditions which are updated continuously;
selecting, from said forest stands with said values of said bearing capacity indexes, forest stands that have said values corresponding a predetermined value of said bearing capacity index for a given moment of time or for a given planning period;
selecting, from the forest stands that have the predetermined value of said bearing capacity index, forest stands that satisfy a predetermined demand of timber quantities and assortments for said given moment of time or for said given planning period;
determining a harvesting plan for the predetermined demand satisfying forest stands utilizing said values of said bearing capacity indexes;
selecting a forest machine in such a way that the forest machine has a bearing capacity classification corresponding to the bearing capacity index of the predetermined demand satisfying forest stands; and
harvesting the predetermined demand satisfying forest stands using the forest machine selected.

11. A method of harvesting forest stands comprising:
maintaining data in a computer-implemented database on properties of soils of forest stands marked for cutting;
determining on a basis of weather forecast data for a given future moment of time, future weather conditions prevailing in the forest stands at said given future moment of time, said future weather conditions, when changing affecting said properties of the soils of the forest stands;
receiving said weather forecast data for said given future moment of time in a form of geographic information from an operator maintaining or forecasting data related to said future weather conditions;
computing, using a computer processor, on a basis of a model, a predicted value for a bearing capacity index for each forest stand, wherein said bearing capacity index is dependent on said properties of the soil of the forest stand, bearing capacity of the soil of the forest stand and said future weather conditions, wherein said values of said bearing capacity indexes change at different moments of time and depending on said future weather conditions; and
maintaining data in a computer-implemented database on said values of said bearing capacity indexes determined for the forest stands;
updating continuously said values of said bearing capacity indexes on a basis of said future weather conditions which are updated continuously;
selecting, from said forest stands with said values of said bearing capacity indexes, forest stands that have said values corresponding a predetermined value of said bearing capacity index for a given moment of time or for a given planning period;
selecting, from the forest stands that have the predetermined value of said bearing capacity index, forest stands that satisfy a predetermined demand of timber quantities and assortments for said given moment of time or for said given planning period;
determining a harvesting plan for the predetermined demand satisfying forest stands utilizing said values of said bearing capacity indexes;
selecting a forest machine in such a way that surface pressure caused by the forest machine on soil and related to bearing capacity of the soil is as required by the predetermined value of said bearing capacity index; and
harvesting the predetermined demand satisfying forest stands using the forest machine selected.

* * * * *